(12) United States Patent
Kimura et al.

(10) Patent No.: US 11,775,809 B2
(45) Date of Patent: Oct. 3, 2023

(54) IMAGE PROCESSING APPARATUS, IMAGING APPARATUS, IMAGE PROCESSING METHOD, NON-TRANSITORY COMPUTER-READABLE STORAGE MEDIUM

(71) Applicant: CANON KABUSHIKI KAISHA, Tokyo (JP)

(72) Inventors: Makoto Kimura, Tokyo (JP); Tsewei Chen, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 363 days.

(21) Appl. No.: 16/876,224

(22) Filed: May 18, 2020

(65) Prior Publication Data

US 2020/0372332 A1 Nov. 26, 2020

(30) Foreign Application Priority Data

May 23, 2019 (JP) ................... 2019-097073

(51) Int. Cl.
*G06N 3/063* (2023.01)
*G06V 10/44* (2022.01)
*G06V 10/764* (2022.01)
*G06V 10/82* (2022.01)
*G06V 10/94* (2022.01)

(52) U.S. Cl.
CPC .......... *G06N 3/063* (2013.01); *G06V 10/454* (2022.01); *G06V 10/764* (2022.01); *G06V 10/82* (2022.01); *G06V 10/94* (2022.01)

(58) Field of Classification Search
CPC .... G06V 10/44; G06V 10/454; G06V 10/764; G06V 10/82; G06V 10/94; G06N 3/0454; G06N 3/063; G06K 9/627
See application file for complete search history.

(56) References Cited

U.S. PATENT DOCUMENTS

| 7,937,346 B2* | 5/2011 | Kato .................. G06N 3/08 706/26 |
| 8,391,306 B2* | 3/2013 | Ito .................... G06N 3/063 370/412 |
| 9,710,265 B1 | 7/2017 | Temam et al. |
| 2010/0223219 A1* | 9/2010 | Kato .................. G06N 3/08 711/E12.001 |
| 2011/0239224 A1* | 9/2011 | Yamamoto ............. G06N 3/08 718/104 |
| 2018/0121795 A1* | 5/2018 | Kato ................. G06V 10/955 |
| 2018/0247182 A1* | 8/2018 | Motoya ................ G06N 3/08 |

(Continued)

*Primary Examiner* — Bobbak Safaipour
(74) *Attorney, Agent, or Firm* — Venable LLP

(57) ABSTRACT

An apparatus includes a storage control unit that divides, into two-dimensional blocks, a feature image of a layer and stores the respective blocks in any one of a predetermined number of memories, a unit that determines a pattern for reading blocks from the memories based on information relating to an operation on the feature image, and a unit that reads blocks from the memories in accordance with the pattern. The storage control unit assigns repeatedly, for the two-dimensional blocks, the memories in a predetermined order from a head row/column along a row/column. In a second or a subsequent row/column, a memory, which the assignment is started, is shifted by a constant number from a previous row/column in the predetermined order.

14 Claims, 16 Drawing Sheets

(56) References Cited

U.S. PATENT DOCUMENTS

| | | | |
|---|---|---|---|
| 2018/0253641 A1* | 9/2018 | Yachide | G06N 3/04 |
| 2020/0409760 A1* | 12/2020 | Nakashima | G06V 10/955 |
| 2021/0004667 A1* | 1/2021 | Wakino | G06N 3/063 |
| 2021/0011653 A1* | 1/2021 | Wakino | G06F 3/0688 |
| 2021/0158068 A1* | 5/2021 | Chen | G06F 18/21 |
| 2021/0233283 A1* | 7/2021 | Tanabe | G06N 3/045 |
| 2022/0222771 A1* | 7/2022 | Berger | G06T 1/60 |
| 2023/0020620 A1* | 1/2023 | Chen | B23K 26/38 |

* cited by examiner

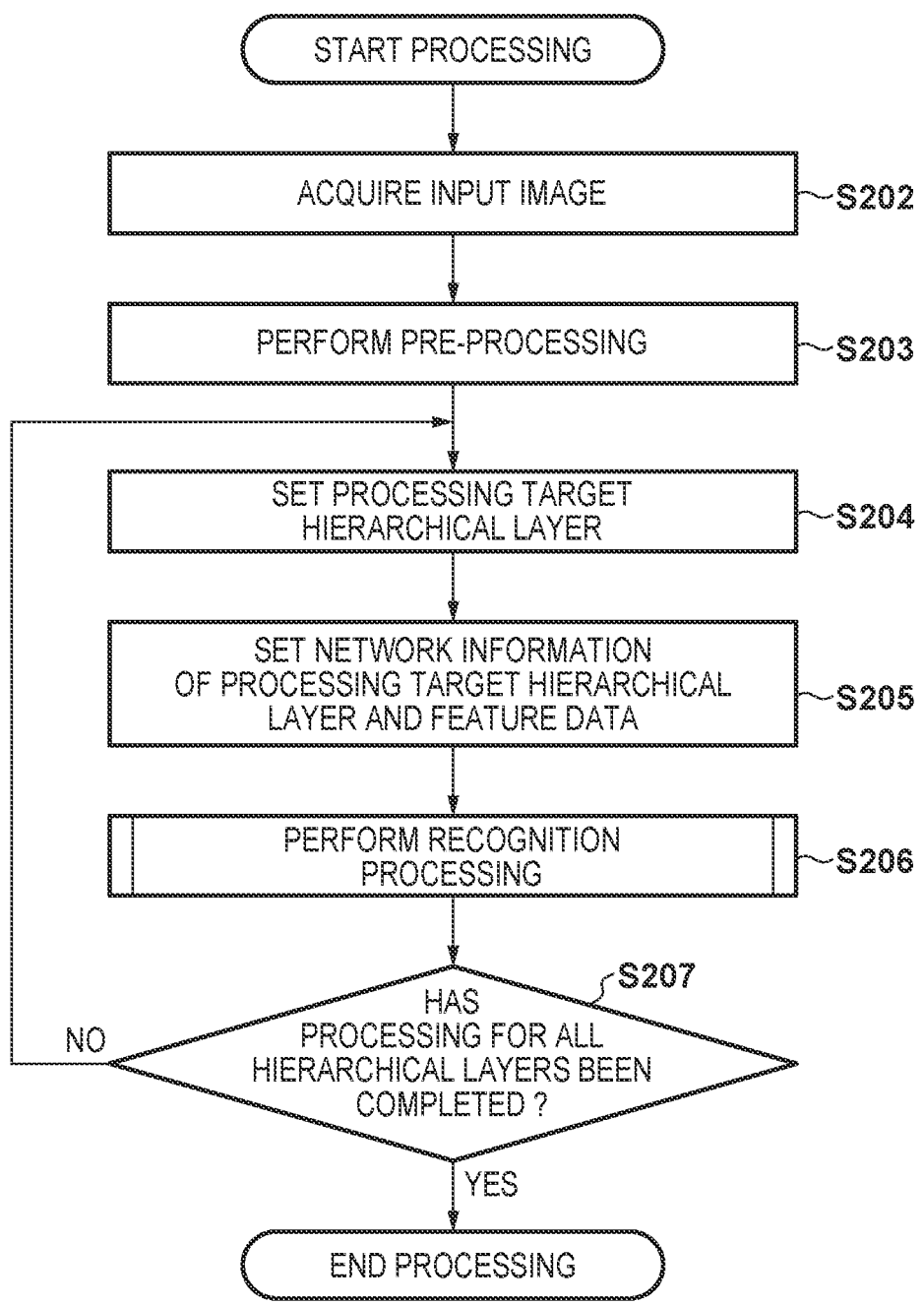

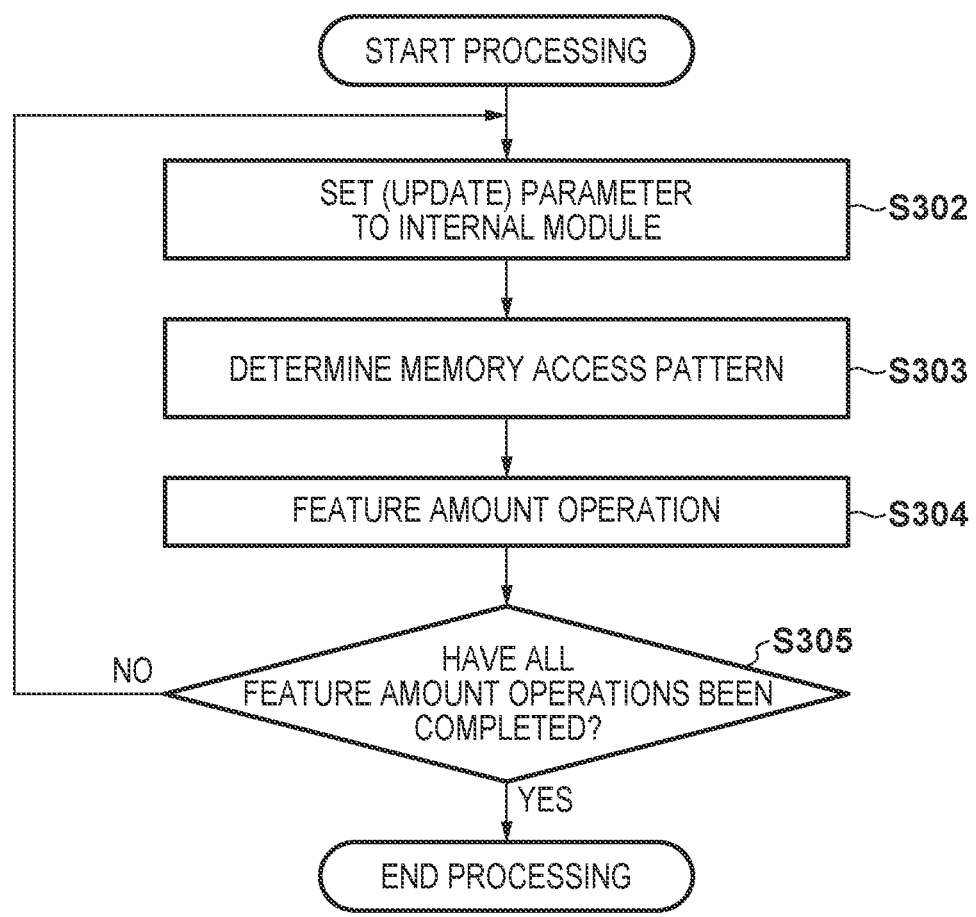

FIG. 4A

| | blk(0,0) | blk(1,0) | blk(2,0) | blk(3,0) | blk(4,0) | blk(5,0) | blk(6,0) | blk(7,0) | blk(8,0) | blk(9,0) |
|---|---|---|---|---|---|---|---|---|---|---|
| | blk(0,1) | blk(1,1) | blk(2,1) | blk(3,1) | blk(4,1) | blk(5,1) | blk(6,1) | blk(7,1) | blk(8,1) | blk(9,1) |
| | blk(0,2) | blk(1,2) | blk(2,2) | blk(3,2) | blk(4,2) | blk(5,2) | blk(6,2) | blk(7,2) | blk(8,2) | blk(9,2) |
| | blk(0,3) | blk(1,3) | blk(2,3) | blk(3,3) | blk(4,3) | blk(5,3) | blk(6,3) | blk(7,3) | blk(8,3) | blk(9,3) |
| | blk(0,4) | blk(1,4) | blk(2,4) | blk(3,4) | blk(4,4) | blk(5,4) | blk(6,4) | blk(7,4) | blk(8,4) | blk(9,4) |
| | blk(0,5) | blk(1,5) | blk(2,5) | blk(3,5) | blk(4,5) | blk(5,5) | blk(6,5) | blk(7,5) | blk(8,5) | blk(9,5) |

EXAMPLE OF ONE FEATURE IMAGE BLOCK DIVISION

FIG. 4B

| M0 | M1 | M2 | M3 | M0 | M1 | M2 | M3 | M0 | M1 |
|---|---|---|---|---|---|---|---|---|---|
| M2 | M3 | M0 | M1 | M2 | M3 | M0 | M1 | M2 | M3 |
| M0 | M1 | M2 | M3 | M0 | M1 | M2 | M3 | M0 | M1 |
| M2 | M3 | M0 | M1 | M2 | M3 | M0 | M1 | M2 | M3 |
| M0 | M1 | M2 | M3 | M0 | M1 | M2 | M3 | M0 | M1 |
| M2 | M3 | M0 | M1 | M2 | M3 | M0 | M1 | M2 | M3 |

EXAMPLE OF MEMORY BANK AND FEATURE IMAGE ALLOCATION
(CASE IN WHICH N = 2)

FIG. 4C

| ADDRESS | M0 | M1 | M2 | M3 |
|---|---|---|---|---|
| 0 | blk(0,0) | blk(1,0) | blk(2,0) | blk(3,0) |
| 1 | blk(4,0) | blk(5,0) | blk(6,0) | blk(7,0) |
| 2 | blk(8,0) | blk(9,0) | blk(0,1) | blk(1,1) |
| 3 | blk(2,1) | blk(3,1) | blk(4,1) | blk(5,1) |
| 4 | blk(6,1) | blk(7,1) | blk(8,1) | blk(9,1) |
| 5 | blk(0,2) | blk(1,2) | blk(2,2) | blk(3,2) |

ALLOCATION OF ADDRESS FOR EACH MEMORY BANK (CASE IN WHICH N = 2)

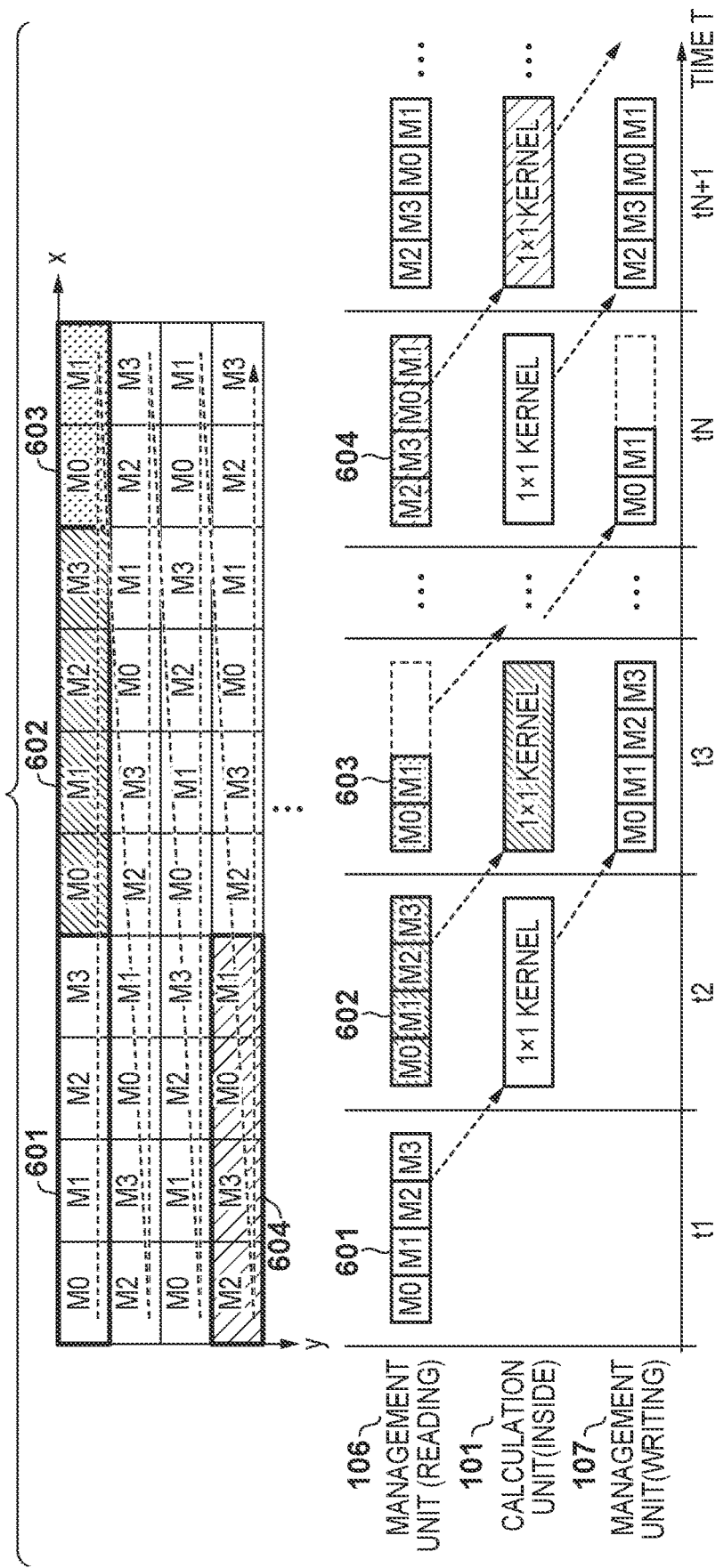

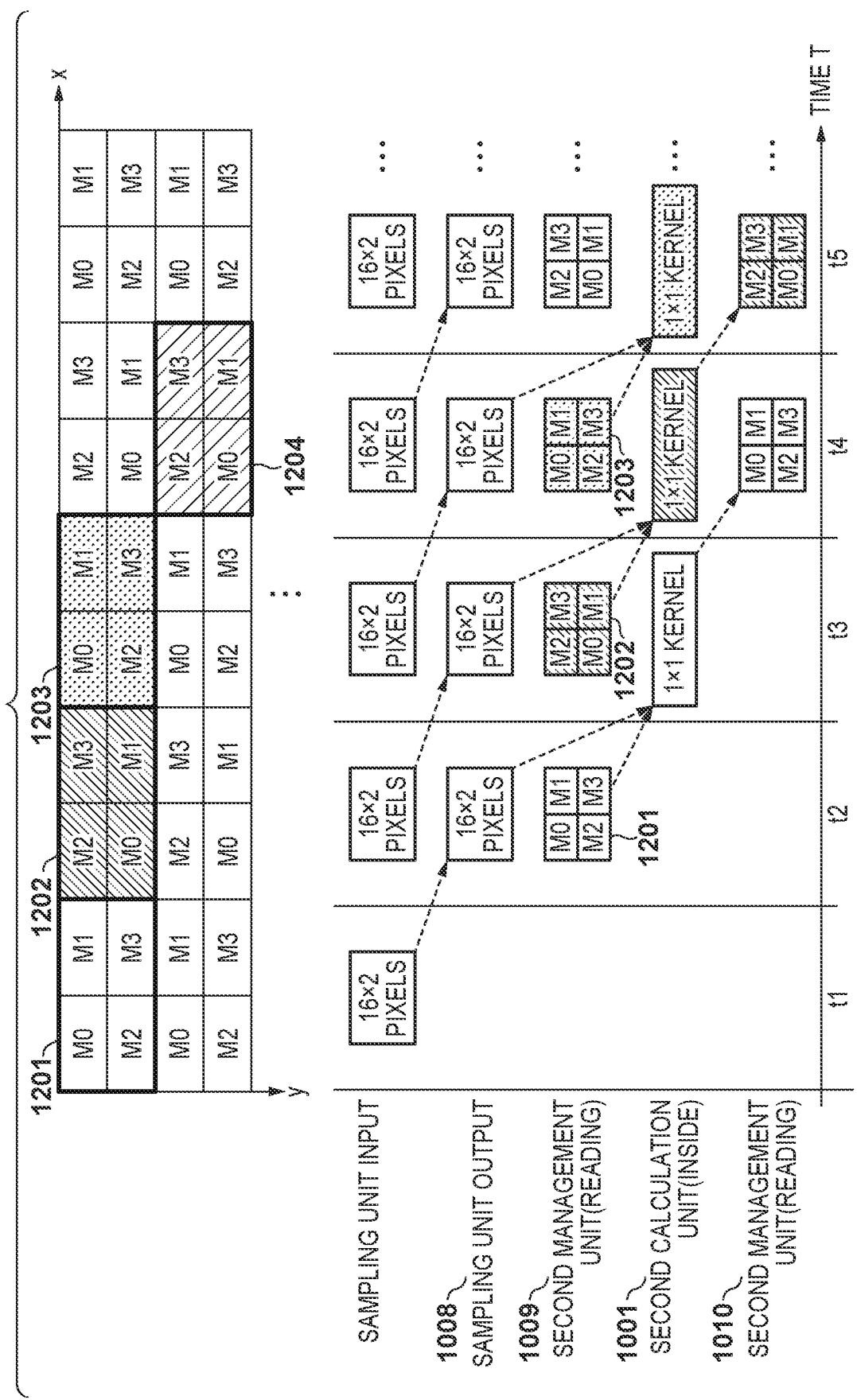

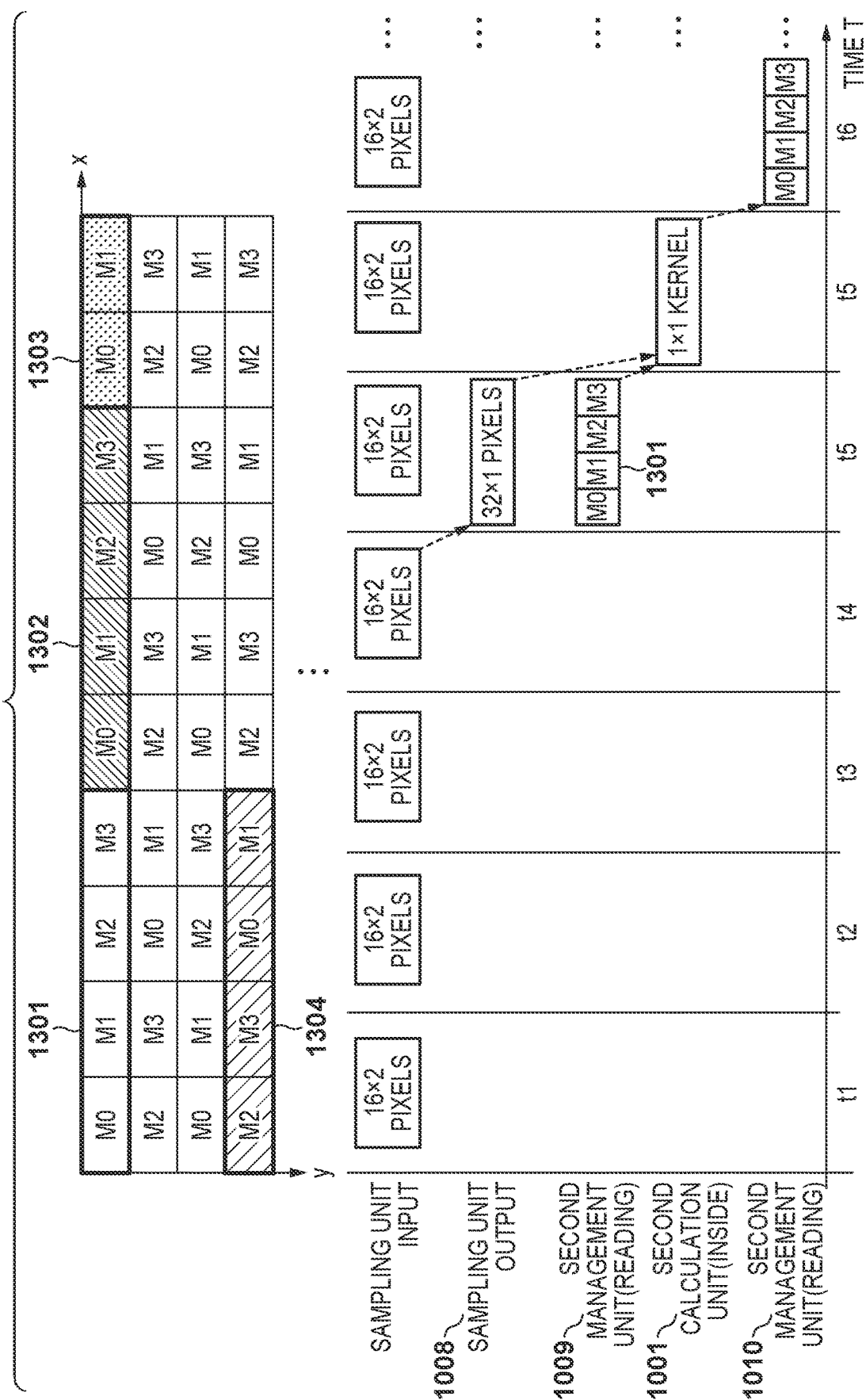

FIG. 14A

EXAMPLE OF FEATURE IMAGE AND MEMORY BANK ALLOCATION (CASE IN WHICH N = 3)

FIG. 14B

EXAMPLE OF FEATURE IMAGE AND MEMORY BANK ALLOCATION (CASE IN WHICH N = 4)

FIG. 15

| | | | | | | | |
|---|---|---|---|---|---|---|---|
| M0 | M4 | M8 | M12 | M0 | M4 | M8 | M12 |
| M1 | M5 | M9 | M13 | M1 | M5 | M9 | M13 |
| M2 | M6 | M10 | M14 | M2 | M6 | M10 | M14 |
| M3 | M7 | M11 | M15 | M3 | M7 | M11 | M15 |
| M4 | M8 | M12 | M0 | M4 | M8 | M12 | M0 |
| M5 | M9 | M13 | M1 | M5 | M9 | M13 | M1 |
| M6 | M10 | M14 | M2 | M6 | M10 | M14 | M2 |
| M7 | M11 | M15 | M3 | M7 | M11 | M15 | M3 |
| M8 | M12 | M0 | M4 | M8 | M12 | M0 | M4 |
| M9 | M13 | M1 | M5 | M9 | M13 | M1 | M5 |
| M10 | M14 | M2 | M6 | M10 | M14 | M2 | M6 |
| M11 | M15 | M3 | M7 | M11 | M15 | M3 | M7 |
| M12 | M0 | M4 | M8 | M12 | M0 | M4 | M8 |
| M13 | M1 | M5 | M9 | M13 | M1 | M5 | M9 |
| M14 | M2 | M6 | M10 | M14 | M2 | M6 | M10 |
| M15 | M3 | M7 | M11 | M15 | M3 | M7 | M11 |
| M0 | M4 | M8 | M12 | M0 | M4 | M8 | M12 |
| M1 | M5 | M9 | M13 | M1 | M5 | M9 | M13 |

1501 (left column), 1502 (right block)

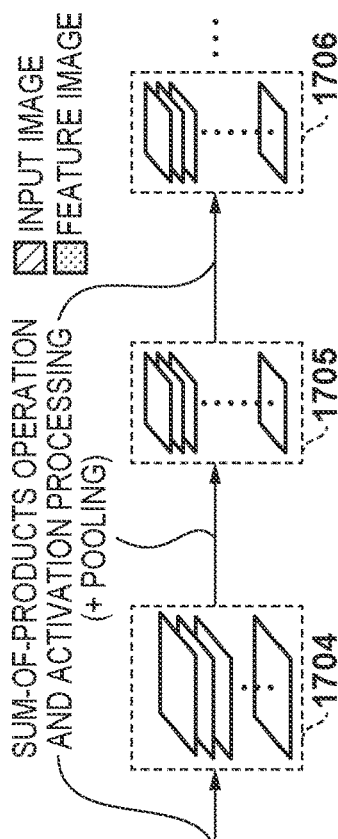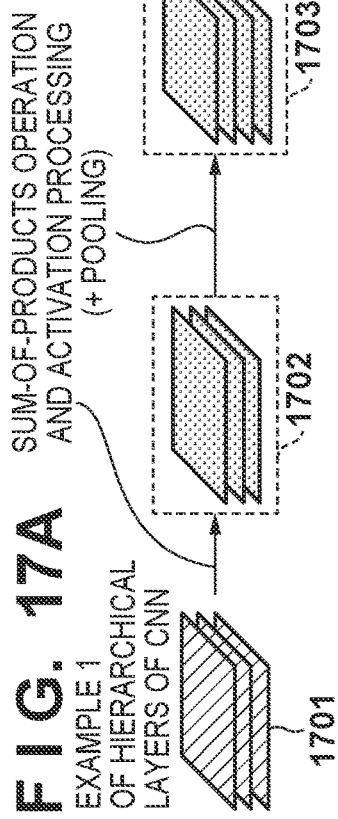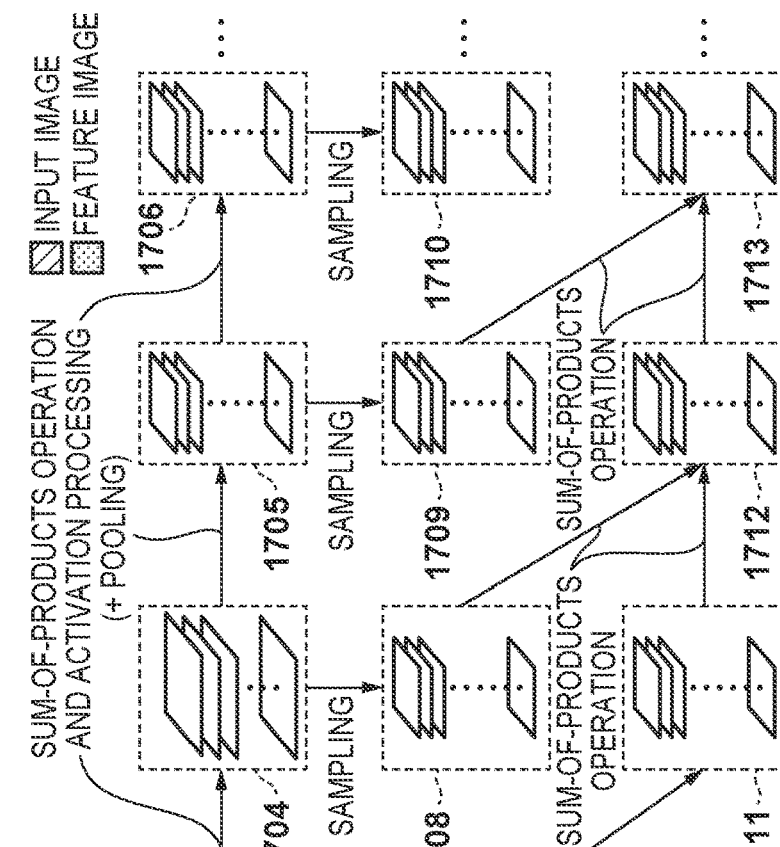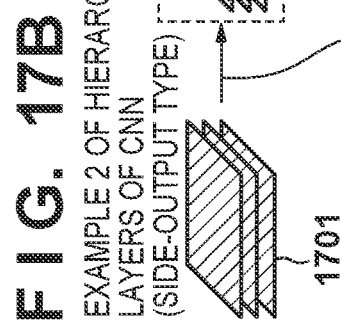

IMAGE PROCESSING APPARATUS, IMAGING APPARATUS, IMAGE PROCESSING METHOD, NON-TRANSITORY COMPUTER-READABLE STORAGE MEDIUM

CROSS-REFERENCE TO RELATED APPLICATIONS

This application claims the benefit of Japanese Patent Application No. 2019-097073, filed May 23, 2019, which is hereby incorporated by reference herein in its entirety.

BACKGROUND OF THE INVENTION

Field of the Invention

The present invention relates to an image processing technique that uses a hierarchical neural network.

Description of the Related Art

In recent years, the accuracy of image recognition has been increased by the progress of deep learning. A convolutional neural network (CNN) is a known technique used for deep learning.

In a CNN, a plurality of hierarchical layers are hierarchically connected. Each hierarchical layer includes a plurality of feature images. In the CNN, processes such as a filter processing operation that uses filter coefficients determined in advance by learning and pixels (feature data) of a feature image, pooling, and activation are repeated for each feature image and for each hierarchical layer. The filter process consists of a convolution operation (a sum-of-products operation). In the CNN, various recognition processes are realized by the combination of the hierarchical structure, the filter coefficients, and the like.

The specification of U.S. Pat. No. 9,710,265 discloses a CNN hardware architecture. The architecture includes a memory for holding feature data, a memory for holding sum-of-products operation parameters, and a plurality of sum-of-products operators capable of processing feature images in parallel. By adaptively changing the settings of the plurality of the sum-of-products operators in accordance with sum-of-products operation parameters read out from the memory, it is possible to perform various arithmetic operations on the feature data held in another memory.

However, the processing target region for feature data required by the sum-of-products operators differs depending on the sum-of-products operation parameters. For example, when the sum-of-products operator performs a 3×3 convolution operation, it is necessary to acquire three rows of feature data, and when the sum-of-products operator performs a 1×1 convolution operation, it is necessary to acquire one row of feature data from the memory. Consider the case when the feature image is divided into units of 8 pixels×1 pixel and stored in one address of the memory in these units. If one clock cycle is required for one memory access, pixels required for a 1×1 convolution operation can be acquired in one clock cycle. On the other hand, since it takes three clock cycles to acquire the pixels required for the 3×3 convolution operation, the sum-of-products operators cannot complete operation of the pixel to be processed during this period. This also applies to the case when a pooling processing unit performs pooling, and the processing cannot be completed until the required the number of rows of feature data are acquired.

Even in the case when a feature image is divided into pixel blocks, and these are distributed and held in a plurality of single-port memories, if data to be processed by a calculating device is arranged at different addresses in the same memory, the data to be processed cannot be acquired all at once. In a CNN, since the processing target region of the calculating device is different for each hierarchical layer, there is a possibility that a plurality of accesses to the same memory will occur. Even if a memory in which the number of ports that can be accessed simultaneously is increased, such as a dual-port memory, is employed, this problem cannot be completely solved.

As described above, although the technique described in the specification of U.S. Pat. No. 9,710,265 can cope with various operations, the number of clock cycles required for memory access becomes the rate-limiting factor depending on the sum-of-products operation parameters, and the number of clock cycles until the sum-of-products operators complete the processing target pixel operation increases. As a result, the number of pixels to be processed by a calculating device per clock cycle is reduced, resulting in a problem that the utilization efficiency of the calculating device is lowered.

SUMMARY OF THE INVENTION

The present invention provides a technique that enables reading in one cycle even if memory access patterns for reading feature images are not the same in all the hierarchical layers in a hierarchical neural network.

According to a first aspect, the present invention provides an image processing apparatus having a plurality of calculation units for performing operations for each hierarchical layer of a hierarchical neural network, the apparatus comprising a storage control unit configured to divide, into two-dimensional blocks, a feature image of a hierarchical layer that is made to be a processing target by the calculation units and store the respective blocks in any one of a predetermined number of memories, a determination unit configured to determine a memory access pattern, which is a pattern for reading blocks from the memories, based on information relating to an operation on the feature image, and a readout unit configured to read blocks from the memories in accordance with the memory access pattern, wherein the storage control unit assigns repeatedly, for the two-dimensional blocks, the predetermined number of memories in a predetermined order from a head row/column along a row/column, in a second or subsequent row/column, a memory that the assignment is started is shifted by a constant number from a previous row/column in the predetermined order.

According to a second aspect, the present invention, provides an imaging apparatus, comprising an image input unit configured to acquire an image by imaging, and an output unit configured to output a calculation result on the image by an image processing apparatus, wherein the image processing apparatus has a plurality of calculation units for performing operations for each hierarchical layer of a hierarchical neural network, the image processing apparatus comprising a storage control unit configured to store each block obtained by dividing a feature image of a hierarchical layer that is made to be a processing target by the calculation units in any of a predetermined number of memories, a determination unit configured to determine a memory access pattern, which is a pattern for reading blocks from the memories, based on information relating to an operation on the feature image, and a readout unit configured to read a block from the memories in accordance with the memory access pattern, wherein the storage control unit, in a case when a block sequence of interest arranged in a first direction in the feature image is divided into units of groups of a predetermined number of blocks, in a case when for each group, the predetermined number of blocks belonging to the group are stored in the predetermined number of memories, stores a block, which is immediately below a block stored in a memory of a first position among the predetermined number in the block sequence of interest, in a memory of a second position that is determined by the first position and the predetermined number, and the readout unit reads a block from the predetermined number of memories in one cycle according to the memory access pattern.

According to a third aspect, the present invention provides an image processing method to be performed by an image processing apparatus having a plurality of calculation units for performing operations for each hierarchical layer of a hierarchical neural network, the method comprising dividing, into two-dimensional blocks, a feature image of a hierarchical layer that is made to be a processing target by the calculation units and storing the respective blocks in any one of a predetermined number of memories determining a memory access pattern, which is a pattern for reading blocks from the memories, based on information relating to an operation on the feature image, and reading blocks from the memories in accordance with the memory access pattern, wherein, in the storing, for the two-dimensional blocks, the predetermined number of memories are assigned repeatedly in a predetermined order from a head row/column along a row/column, in a second or subsequent row/column, a memory that the assignment is started is shifted by a constant number from a previous row/column in the predetermined order.

According to a fourth aspect, the present invention provides a non-transitory computer-readable storage medium storing a computer program for causing a computer of an image processing apparatus having a plurality of calculation units for performing operations for each hierarchical layer of a hierarchical neural network to function as a storage control unit configured to divide, into two-dimensional blocks, a feature image of a hierarchical layer that is made to be a processing target by the calculation units and store the respective blocks in any one of a predetermined number of memories, a determination unit configured to determine a memory access pattern, which is a pattern for reading blocks from the memories, based on information relating to an operation on the feature image, and a readout unit configured to read blocks from the memories in accordance with the memory access pattern, wherein the storage control unit assigns repeatedly, for the two-dimensional blocks, the predetermined number of memories in a predetermined order from a head row/column along a row/column, in a second or subsequent row/column, a memory that the assignment is started is shifted by a constant number from a previous row/column in the predetermined order.

Further features of the present invention will become apparent from the following description of exemplary embodiments (with reference to the attached drawings).

BRIEF DESCRIPTION OF THE DRAWINGS

FIG. 2 is a flowchart illustrating operation of an image processing system.

FIG. 3 is a flowchart illustrating the detail of the process in step S206.

FIGS. 4A to 4C are views illustrating a relationship between pixel blocks and a memory.

FIG. 5 is a view illustrating an example of a method of determining an access pattern.

FIG. 6 is a view illustrating an example of a timing chart when a 1×1 kernel operation is performed.

FIG. 12 is a view illustrating an example of a timing chart for processing in a case when no sampling processing is performed.

FIG. 13 is a view illustrating an example of a timing chart for processing in a case when sampling processing is performed.

FIGS. 14A and 14B are views illustrating an example of memory allocation when N=3 and N=4, respectively.

FIG. 15 is a view illustrating an example of memory allocation.

FIGS. 17A and 17B are views illustrating a configuration example of a CNN.

DESCRIPTION OF THE EMBODIMENTS

Figure 1:
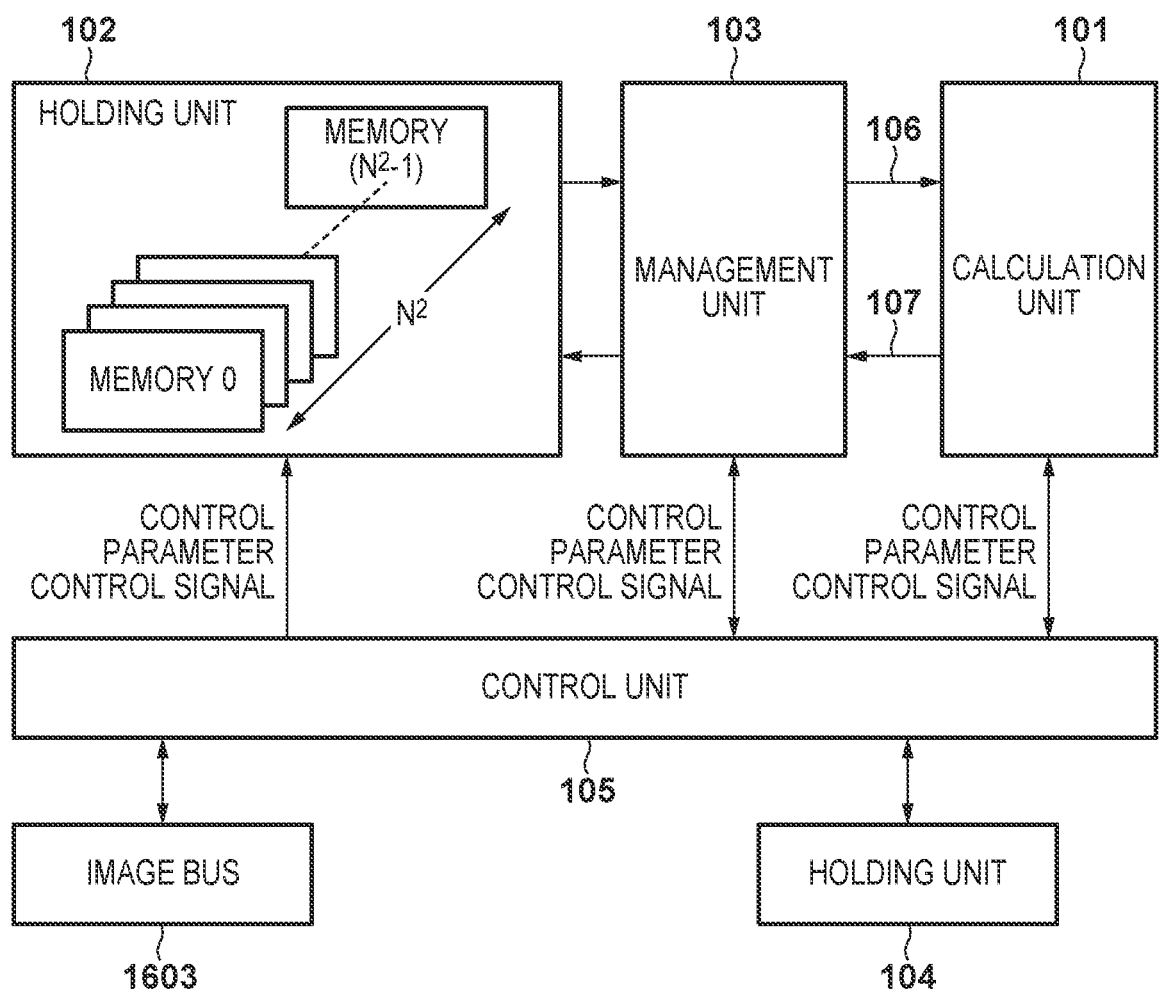
FIG. 1 is a block diagram illustrating a configuration example of a recognition processing unit 1601.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

First, a configuration example of the image processing system according to the present embodiment will be described with reference to a block diagram of FIG. 16. An image processing system according to the present embodiment has a function of detecting a specific object from an input image, and is, for example, an imaging apparatus that detects a specific object from a captured image.

An image input unit 1600 includes an optical system, a photoelectric converting device such as a CCD or a CMOS sensor, a driver circuit for controlling the sensor, an AD converter, a signal processing circuit for performing various image corrections, a frame buffer, and the like, and the image input unit 1600 generates and outputs a captured image obtained by capturing an image of the outside world. CCD and CMOS are abbreviations for Charge-Coupled Devices, Complementary Metal Oxide Semiconductor.

The recognition processing unit 1601 functions as an image processing apparatus, and performs processing for using a captured image that is captured by the image input unit 1600 as an input image and detecting a specific object from the input image. Details of the recognition processing unit 1601 will be described later with reference to FIG. 1.

A DMAC (Direct Memory Access Controller) 1602 functions as a data transfer unit that controls data transfer between each processing unit on the image bus 1603 and each processing unit on the CPU bus 1604. An image input unit 1600, a recognition processing unit 1601, a pre-processing unit 1606, and a DMAC 1602 are connected to the image bus 1603, and a CPU 1607, a ROM 1608, a RAM 1609 are connected to the CPU bus 1604.

A bridge 1605 provides a bridge function between the image bus 1603 and the CPU bus 1604. Data transfer between the processing units on the image bus 1603 and the processing units on the CPU bus 1604 is performed via the bridge 1605.

The pre-processing unit 1606 performs various pre-processing in order that processing by the recognition processing unit 1601 on the captured image captured by the image input unit 1600 is performed effectively. Specifically, the pre-processing unit 1606 performs image conversion processing such as color conversion processing and contrast correction processing on the captured image. Such image conversion processing is performed using, for example, image processing hardware.

The CPU 1607 executes various processes using computer programs and data stored in a ROM (Read Only Memory) 1608 and a RAM (Random Access Memory) 1609. As a result, the CPU 1607 controls the operation of the entire image processing system, and executes or controls the processes described later as being performed by the image processing system.

The ROM 1608 stores computer programs and data for causing the CPU 1607 to execute or to control processes described later as those performed by the image processing system, data sets for operation of the recognition processing unit 1601, and the like. Such data sets include parameters defining a CNN used by the recognition processing unit 1601 to detect a specific object from the input image.

The CNN according to the present embodiment has, for example, a hierarchical structure as illustrated in FIG. 17A and FIG. 17B, and performs various calculation processing on feature images of each hierarchical layer. In the configuration example (CNN hierarchy example 1) of FIG. 17A, input images 1701 (input hierarchical layer) are input to a hierarchical layer 1702, and various calculation processing is performed on feature images based on the input images in each of the hierarchical layers 1702 to 1706. In the configuration example (CNN hierarchy example 2) of FIG. 17B, the input images 1701 are input to the hierarchical layer 1702, and various calculation processing is performed on feature images based on the input images in each hierarchical layer. In FIGS. 17A and 17B, the straight line connecting the hierarchical layers means a sum-of-products operation and activation processing. Also, depending on the hierarchical layer, it may include a pooling process.

The data set stored in the ROM 1608 is transferred to the recognition processing unit 1601 by the DMAC 1602, and the recognition processing unit 1601 sets the CNN using the transferred data set.

The RAM 1609 has areas for storing captured images captured by the image input unit 1600, computer programs and data loaded from the ROM 1608, data transferred from the recognition processing unit 1601, and the like. Further, the RAM 1609 has a work area used when the CPU 1607 executes various processes. In this manner, the RAM 1609 can appropriately provide various areas.

Figure 16:
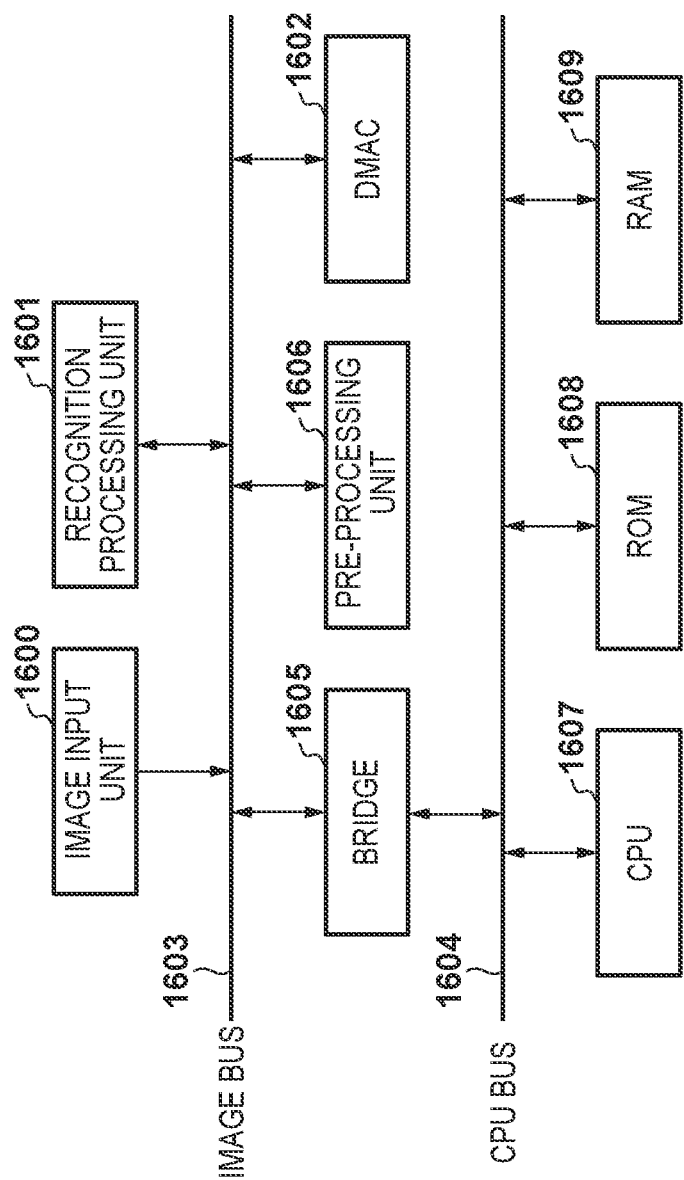
FIG. 16 is a block diagram illustrating a configuration example of an image processing system.

The configuration illustrated in FIG. 16 is only an example of a configuration applicable to the image processing system according to the present embodiment. Next, an example of the configuration of the recognition processing unit 1601 will be described with reference to the block diagram of FIG. 1.

A calculation unit 101 includes a plurality of logical operators. A holding unit 102 has $N^2$ (predetermined number) memories (memory 0 to memory $N^2-1$) (N is an integer). Pixels (feature data) of feature images are stored in each of the $N^2$ memories (memory 0 to memory $N^2-1$) (storage control). A management unit 103 manages access (memory access) to the holding unit 102. A holding unit 104 stores the control parameters transferred from the ROM 1608 by the DMAC 1602. The control parameters will be described later. A control unit 105 controls the overall operation of the recognition processing unit 1601, and, for example, supplies control parameters stored in the holding unit 104 to the calculation unit 101 and the management unit 103 to control these operations.

Next, operation of the image processing system according to the system of the present embodiment will be described in accordance with the flowchart of FIG. 2. In step S202, the image input unit 1600 generates a captured image by capturing an image, and the CPU 1607 controls the DMAC 1602 to store the captured image generated by the image input unit 1600 in the RAM 1609 as an input image.

In step S203, the pre-processing unit 1606 performs pre-processing on the input image stored in the RAM 1609 in step S202. Then, under the control of the CPU 1607, the input image subjected to the preprocessing by the pre-processing unit 1606 is outputted to the recognition processing unit 1601 by the DMAC 1602. The control unit 105 of the recognition processing unit 1601 divides the input image outputted from the pre-processing unit 1606 into a plurality of pixel blocks, and stores each pixel block in one of the memories 0 to $N^2-1$. Storage of pixel blocks in the memories 0 to $N^2-1$ will be described later.

In step S204, the DMAC 1602 transfers to the recognition processing unit 1601 a "parameter for a sum-of-products operation for the hierarchical layer (processing target hierarchical layer) in which to perform the calculation processing from among the plurality of hierarchical layers in the CNN" included in a data set stored in the ROM 1608. The control unit 105 of the recognition processing unit 1601 sets the processing target hierarchical layer in the CNN using the parameter for the sum-of-products operation transferred from the ROM 1608 by the DMAC 1602.

In step S205, the DMAC 1602 transfers the control parameter stored in the ROM 1608, i.e., "information related to processing for the processing target hierarchical layer" to the recognition processing unit 1601. The control unit 105 of the recognition processing unit 1601 stores the control parameter transferred from the ROM 1608 by the DMAC 1602 in the holding unit 104. In addition, the control unit 105 of the recognition processing unit 1601 notifies the management unit 103 of the address of the pixel block that is the target of processing in the processing target hierarchical layer among the pixel blocks stored in the memories 0 to $N^2-1$.

In step S206, the calculation unit 101 executes arithmetic processing for the processing target hierarchical layer of the CNN, and when the operation for the processing target hierarchical layer is completed, the calculation unit 101 outputs the processing result (detection result for a particular object or feature data of an intermediate hierarchical layer). The result of this process is transferred to the RAM 1609 by the DMAC 1602. The process in step S206 will be described later in detail with reference to FIG. 3.

In step S207, the calculation unit 101 determines whether or not the processing of steps S204 to S206 has been performed for all the hierarchical layers in the CNN. As a result of this determination, when the processing of steps S204 to S206 is performed for all hierarchical layers in the CNN, the processing according to the flowchart of FIG. 2 is completed. On the other hand, when there remains a hierarchical layer in which the processing of steps S204 to S206 is not performed among all hierarchical layers in the CNN, the processing returns to step S204 in order to perform the processing of steps S204 to S206 for the hierarchical layer.

In small CNNs for embedded devices, all hierarchical layers can be processed at once, so the process ends via step S207. On the other hand, in the processing of a large-scale CNN, it is impossible to process all hierarchical layers at once, so that processing of the CNN is performed time divisionally. In such cases, the process returns to step S204 via step S207 to perform calculation processing on the remaining hierarchical layers.

Next, the process in the above-described step S206 will be described in detail in accordance with the flowchart of FIG. 3. In step S302, the control unit 105 supplies a parameter corresponding to a feature amount operation to be performed for the control parameter stored in the holding unit 104 to the calculation unit 101 and the management unit 103 to control these operations. Then, the control unit 105 instructs the calculation unit 101 and the management unit 103 to start processing.

In step S303, when the instruction to start processing is made, the management unit 103 determines a pattern of access (memory access pattern) to the memories 0 to $N^2-1$ based on the "content of calculation processing for the processing target hierarchical layer" indicated by the control parameter. A method of determining the memory access pattern based on the control parameter will be described later.

In step S304, when the management unit 103 receives a memory access instruction from the calculation unit 101, it accesses the "addresses notified from the control unit 105" in memories 0 to $N^2-1$ according to the memory access pattern determined in step S303. Since, by this access, the calculation unit 101 can read the pixel block (feature data) stored in the memory of the access destination, by performing the operation of the processing target hierarchical layer with respect to the read pixel block, a feature amount operation for the determination target hierarchical layer is performed. Then, the calculation unit 101 stores a result (pixel block) of having performed the feature amount operation in one of the memories 0 to $N^2-1$. Storage of pixel blocks in the memories 0 to $N^2-1$ will be described later. Details of the feature amount operation performed in step S304 will be described later.

When the feature amount operation is completed, in step S305, the calculation unit 101 determines whether or not all feature amount operations for the processing target hierarchical layer have completed. When the result of this determination is that all feature amount operations for the processing target hierarchical layer have been completed, the processing proceeds to the above-described step S207, and when a feature amount operation that has not been completed remains, the processing returns to step S302.

Next, memory access in the feature amount operation will be described in detail. Hereafter, an example where N=2 will be described. That is, in the following description, it is assumed that the holding unit 102 has four memories (memories 0 to 3). However, the value of N is not limited to 2.

The holding unit 102 holds a target image (input image, feature image) for each pixel block, and the management unit 103 controls reading and writing to the holding unit 102 for each pixel block. The calculation unit 101 performs an operation on input pixels in parallel by causing a plurality of logical operators to operate in parallel with respect to a pixel block. The content of processing performed by the calculation unit 101 is set by the control parameter. The calculation unit 101 executes activation processing, a kernel operation, a pooling operation, and the like, based on the control parameter. The order of each process or operation, such as execution of the kernel operation after the pooling or execution of the kernel operation before the pooling, can also be changed according to a setting.

FIG. 4A illustrates an example in which a target image is divided into pixel block units. Hereafter, a feature image is used as the target image, but the following description is the same even if the target image is an input image.

In FIG. 4A, the size of the pixel block is 8 pixels horizontally ×1 pixel vertically, and the feature image is divided into pixel blocks each having a size of 8 pixels horizontally ×1 pixel vertically. In FIG. 4A, the horizontal axis is the x-axis, and the vertical axis is the y-axis. The pixel block at position (0, 0) in the upper left corner is denoted by blk(0, 0), and the pixel block at position (x, y) is denoted by blk(x, y).

FIG. 4B is view indicating which of the memories 0 to 3 stores the respective pixel blocks of FIG. 4A. For the pixel blocks in the first row, sets of M0 to M3 are repeatedly (periodically) allocated in this order, such as memory 0 (M0), memory 1 (M1), memory 2 (M2), memory 3 (M3), memory 0 (M0), memory 1 (M1), . . . in order from the left. For the pixel blocks in the second row, sets of M2, M3, M0, and M1 are repeatedly (periodically) allocated in this order, such as memory 2 (M2), memory 3 (M3), memory 0 (M0), memory 1 (M1), memory 2 (M2), . . . in order from the left. For the pixel blocks in the third row, sets of M0 to M3 are repeatedly (periodically) allocated in this order, such as memory 0 (M0), memory 1 (M1), memory 2 (M2), memory 3 (M3), memory 0 (M0), memory 1 (M1), . . . in order from the left.

That is, if the memory allocated to blk(x, y) is the memory p at the position p (p=0, 1, 2, 3), the memory allocated to blk(x, y+1) is the memory q at the position q (q=mod(p+2, 4)). Here, mod(a, b) is a function that returns the remainder when a is divided by b. In general, when the memory allocated to the pixel block is the memory p, the memory allocated to the pixel block immediately below the pixel block is the memory q (q=mod(p+N, $N^2$)).

Therefore, in a case when a pixel block sequence of interest arranged in a first direction in the feature image is divided into units of groups of four pixel blocks, and, for each group, the pixel blocks 0 to 3 belonging to the group are allocated to the memories 0 to 3, respectively. When adjacent pixel block sequences that are adjacent to a pixel block of interest in a second direction orthogonal to the first direction are divided into units of groups of four pixel blocks, the pixel blocks 0 to 3 belonging to the group are allocated to the memories 2, 3, 0, and 1, respectively. The first direction may be either a horizontal direction or a vertical direction.

The pixel blocks stored in the memories 0 to 3 and their addresses are illustrated in FIG. 4C. The value of N is determined according to a maximum kernel size, a maximum pooling window size, a sampling rate, a stride interval, and the like, which are used in all hierarchical layers of the CNN. When the processing target region is 2 pixels×2 pixels, it is necessary to simultaneously read two rows in the vertical direction, so N=2. In the allocation illustrated in FIG. 4B, any 4×1 block (32 pixels×1 pixel) and 2×2 block (16 pixels×2 pixels) can be accessed simultaneously, and required pixel blocks can be read out in one cycle.

An example of a method of determining an access pattern in the management unit 103 will be described with reference to FIG. 5. In the table of FIG. 5, a corresponding access pattern is registered for each combination of the presence or absence of pooling, the pooling window size, and the kernel size. This table is created in advance and stored in the ROM 1608, or the like.

The presence or absence of pooling, the pooling window size, and the kernel size are information included in the control parameter, and the management unit 103 refers to the control parameter to acquire an access pattern corresponding to a combination of such information from the table of FIG. 5.

According to the table of FIG. 5, when pooling processing is "no", the access pattern is determined according to the kernel size. When pooling processing is "no" and kernel size is "1×1", the corresponding access pattern is "4×1 block". When pooling processing is "no" and kernel size is "2×2", the corresponding access pattern is "2×2 block". Meanwhile, when pooling processing is "yes" and kernel size is "2×2", the corresponding access pattern is "4×1 block".

When an access pattern is determined (when a corresponding access pattern is selected from the table of FIG. 5), the management unit 103 specifies the address of the target pixel block of the processing target hierarchical layer in the memories 0 to 3. Then, the management unit 103 accesses the specified address and reads out the pixel block in response to a request from the calculation unit 101.

Although FIG. 5 illustrates a method for selection of an access pattern in a case when a kernel operation is performed after pooling when pooling is enabled, this is merely an example, and the present invention is not limited thereto. That is, if the number of rows or the number of columns of the feature image to be read out from the memory at a time is determined from the control parameter and the size of one pixel block, and the access pattern can be selected, other selection logic/another method may be used. The access pattern may be selected not only based on pooling for reducing the resolution of the feature image, but also based on a setting for unpooling that increases the resolution.

FIG. 6 is an example of a timing chart for when a 1×1 kernel operation is performed. As described above, the management unit 103 determines the access pattern based on the combination of the presence or absence of pooling, the pooling window size, and the kernel size included in the control parameter. In FIG. 6, a 4×1 block (32 pixels horizontally ×1 pixel vertically) corresponding to a 1×1 kernel operation is determined as an access unit, and at t1, a pixel block sequence 601 of blk(0, 0) to blk(3, 0) held in M0 to M3 is read out simultaneously (in one cycle). As illustrated in FIG. 4A and FIG. 4B, blk(0,0) to blk(3,0) are held in M0 to M3, respectively, so they can be accessed simultaneously. In FIG. 6, the processing order of each block is indicated by broken line arrows.

At t2, the pixel block sequence 601 is processed in the calculation unit 101, and the management unit 103 reads out the pixel block sequence 602. At t3, the calculation unit 101 returns the processing result of the pixel block sequence 601 (32 pixels horizontally ×1 pixel vertically) to the management unit 103, and processes the pixel block sequence 602. The management unit 103 reads out the pixel block sequence 603 and inputs it to the calculation unit 101. Since the pixel block sequences that are the processing targets are held in separate memories, the pixel block sequences can be read and rewritten all at once. Incidentally, the management unit 103 receives the processing results of the pixel block sequence 601 from the calculation unit 101 (32 pixels horizontally ×1 pixel vertically), the respective results of processing the pixel block sequence in the pixel block sequence 601 are written back into the memories at the addresses at which the pixel blocks are stored.

Figure 7:
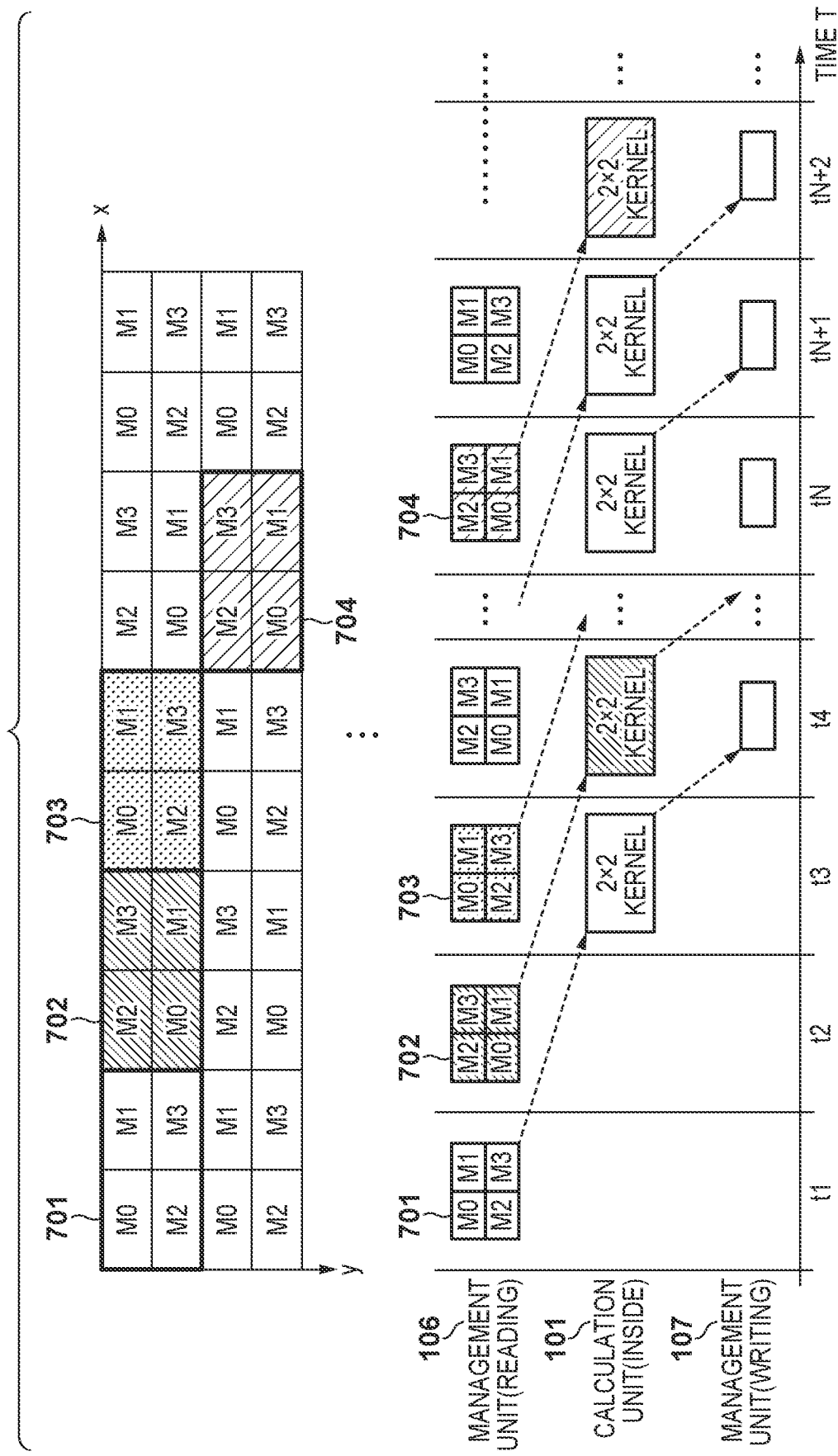
FIG. 7 is a view illustrating an example of a timing chart when a 2×2 kernel operation is performed.

FIG. 7 is a view illustrating an example of a timing chart when a 2×2 kernel operation is performed. The size of one pixel block is the same as that illustrated in FIG. 6 (8 pixels horizontally ×1 pixel vertically). As described above, the management unit 103 determines a 2×2 block in accordance with a 2×2 kernel operation (16 pixels horizontally ×2 pixels vertically) to be the access unit based on the combination of the presence or absence of pooling, the pooling window size, and the kernel size included in the control parameter. Then, at t1, the pixel block sequence 701 of blk(0, 0), blk(1, 0), blk(0, 1), and blk(1, 1) held in M0 to M3 is read out simultaneously (in one cycle). As illustrated in FIG. 4A and FIG. 4B, blk(0, 0), blk(1, 0), blk(0, 1), and blk(1, 1) are held in M0 to M3, respectively, so they can be accessed simultaneously. In FIG. 7, the processing order of each block is indicated by broken line arrows.

At t2, the management unit 103 reads the pixel block sequence 702. When a kernel operation for a size of 2×2 blocks or more is performed, the pixel block sequence 702 is required for the operation of the rightmost pixel of the pixel block sequence 701. Therefore, unlike the case of the 1×1 kernel operation illustrated (FIG. 6), the kernel operation of the pixel block sequence 701 cannot be executed at the time t2.

Next, at t3, the pixel block sequence 701 is processed in the calculation unit 101, and the management unit 103 reads out the pixel block sequence 703. At t4, the calculation unit 101 returns the processing result of the pixel block sequence 701 (16 pixels horizontally ×2 pixels vertically) to the management unit 103, and processes the pixel block sequence 702. Incidentally, the management unit 103 receives the processing result of the pixel block sequence 701 from the calculation unit 101 (16 pixels horizontally ×2 pixels vertically), the respective results of processing the pixel block sequences in the pixel block sequence 701 are written back into the allocated memory address, as described later.

Figure 8:
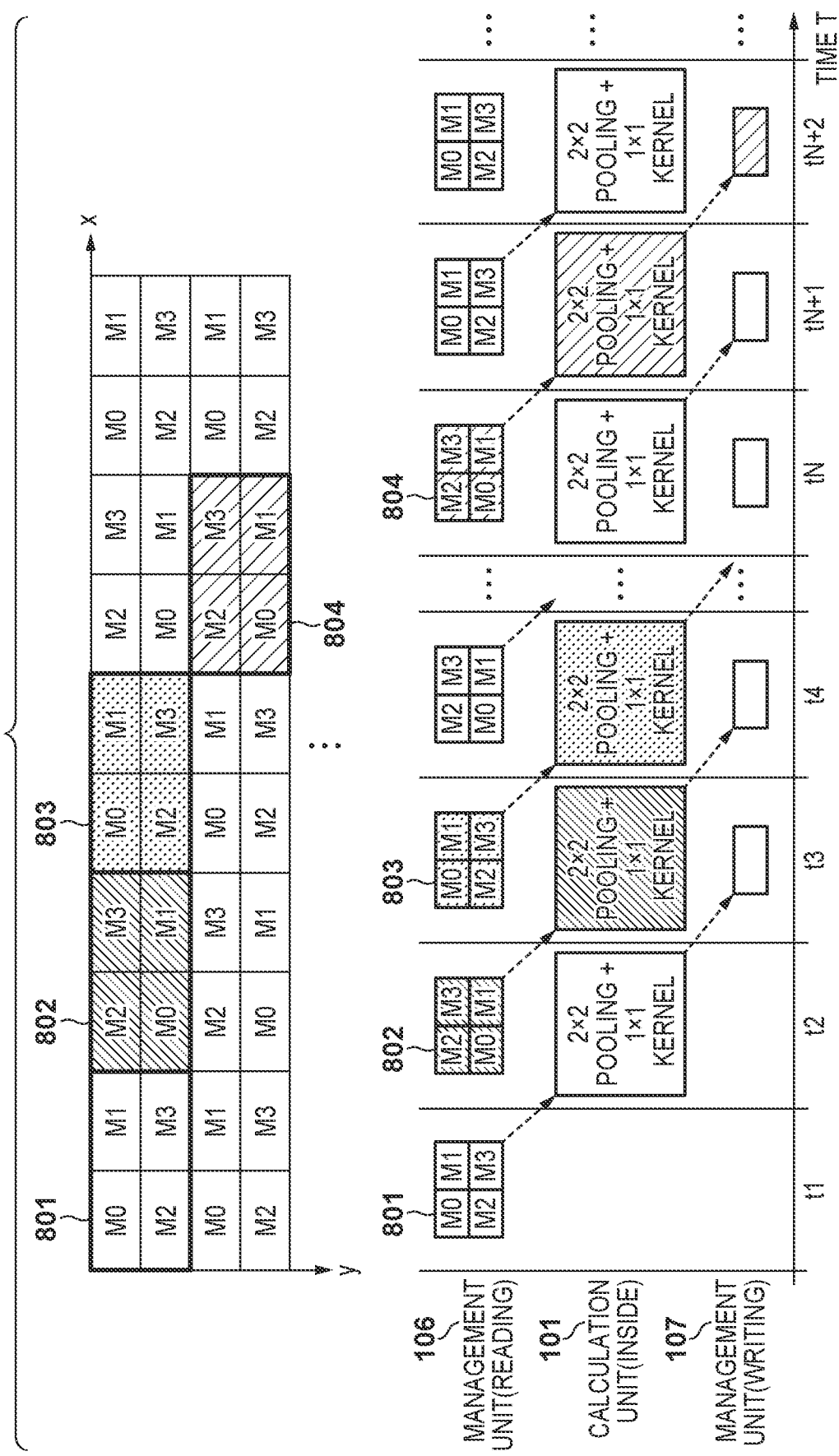
FIG. 8 is a view illustrating an example of a timing chart when a 1×1 kernel operation is performed after a 2×2 pooling operation.

FIG. 8 is a view illustrating an example of a timing chart when a 1×1 kernel operation is performed after a 2×2 pooling operation. At times t1 to t4 and tN to tN+2, the memory access pattern for access by the management unit 103 is the same as that illustrated in FIG. 7. The management unit 103 determines 2×2 blocks to be the access units from the combination of the presence or absence of pooling, the pooling window size, and the kernel size included in the control parameter. In FIG. 7, the input of the pixel block sequence 702 is necessary for the right end processing of the pixel block sequence 701, but is not necessary under the condition of FIG. 8, and the calculation in relation to the pixel block sequence 801 can be started at time t2 following time t1 when the pixel block sequence 801 is input.

As described above with reference to FIG. 8 from the FIGS. 4A to 4C, the management unit 103 performs feature image memory allocation in accordance with the maximum kernel size, the maximum pooling window size, and the block size that can be taken. As a result, even if the processing target kernel size to be processed, the presence or absence of pooling, and the pooling window size are dynamically changed for each hierarchical layer, the management unit 103 can supply the pixel block sequence required by the calculation unit 101 every clock cycle. Therefore, the waiting time and the stopping period of the calculation unit 101 are shortened, and the utilization efficiency is improved.

In the timing charts of FIG. 6 to FIG. 8, the management unit 103 reads and writes data from and to the same memory at the same time. This is limited to a case when the memories (memories 0 to $N^2-1$) are configured to be a dual-port type, and a case where the processing performance (throughput) of the calculation unit 101 is high. When the processing performance of the calculation unit 101 and the calculation unit resources are limited, a delay of several clock cycles occurs from when data is input to the calculation unit 101 until when the calculation result is obtained. In this case, it is possible to apply a single port type memory instead of a dual port type memory.

Figure 9:
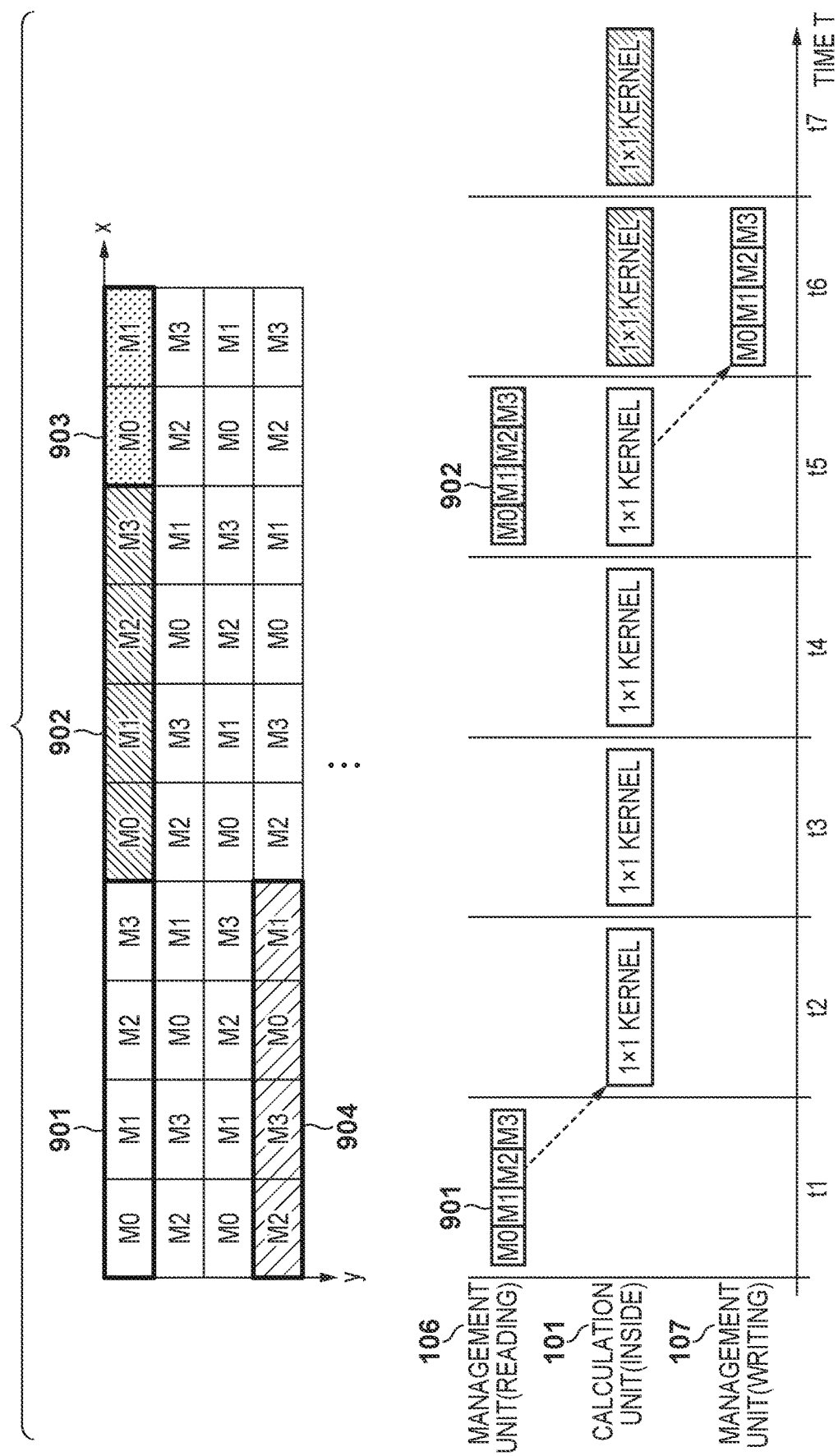
FIG. 9 is a view illustrating an example of a timing chart in a case when the calculation unit 101 processes input data in a multi-clock cycle.

FIG. 9 is an example of a timing chart in the case when the calculation unit 101 processes input data in a multi clock cycle rather than a single clock cycle. The pixel block sequence 901 input at time t1 is processed at times t2 to t5, and the calculation result is output at time t6. The management unit 103 can perform exclusion control for reading and writing of data in accordance with the processing performance of the calculation unit 101, and, in this case, the holding unit 102 can be configured by a single-port memory. When the processing performance of the calculation unit 101 and resources of the calculation unit are limited, the value of N may be determined not by the maximum kernel size, the maximum pooling window size, or the like, but rather according to the throughput or the resources of the calculation unit 101.

As illustrated in FIG. 6, when the calculation of 1 pixel×1 pixel is performed, the processing result of the calculation unit 101 may be rewritten as is to the address of the input data. For example, the operation result of blk(0,0) in the FIGS. 4A to 4C may be written back to the address of blk(0,0). When the calculation unit 101 performs an operation of 2 pixels×2 pixels or more, since the pixel size at the time of reading and the pixel size returned by the calculation unit 101 are different from each other, it is impossible to rewrite as is. In this case, a plurality of memories different for reading and writing (for example, M0 to M3 for reading and M4 to M7 for writing) may be prepared and allocated in the holding unit 102. Alternatively, an address space for at least two feature images may be secured for each memory, and the address region for reading and the address region for writing may be separated from each other. Alternatively, the write data may be held in the management unit 103, and the write data may be held until the shape becomes the same as the shape (pixel size) at the time of reading, and then written back to the address at the time of reading.

In the case of the allocation illustrated in the FIGS. 4A to 4C, the management unit 103 can access an arbitrary 1×1 block, 2×1 block, 3×1 block, and 1×2 block in parallel in addition to the 4×1 block and 2×2 block. Also, these patterns may be added as options to the table of FIG. 5 as access patterns in a low power consumption mode for reducing the power consumption of the entire image processing system or in a low speed operation mode when there is room to sacrifice on processing performance of the entire image processing system.

As described above, according to the present embodiment, even if the memory access patterns for reading feature images in all hierarchical layers of a hierarchical neural network are not the same, the feature image can be read in one cycle. As a result, it is possible to improve the utilization efficiency of the calculation unit 101.

Note that the pixel block size of 8 pixels vertically ×1 pixel horizontally illustrated in the present embodiment is given as only an example for the purpose of concrete description, and the present embodiment can be applied to any pixel block size.

Second Embodiment

Differences from the first embodiment will be described below, and details are assumed to be the same as in the first embodiment unless specifically mentioned below. In the present embodiment, an image processing system using a side-output type CNN will be described.

Figure 10:
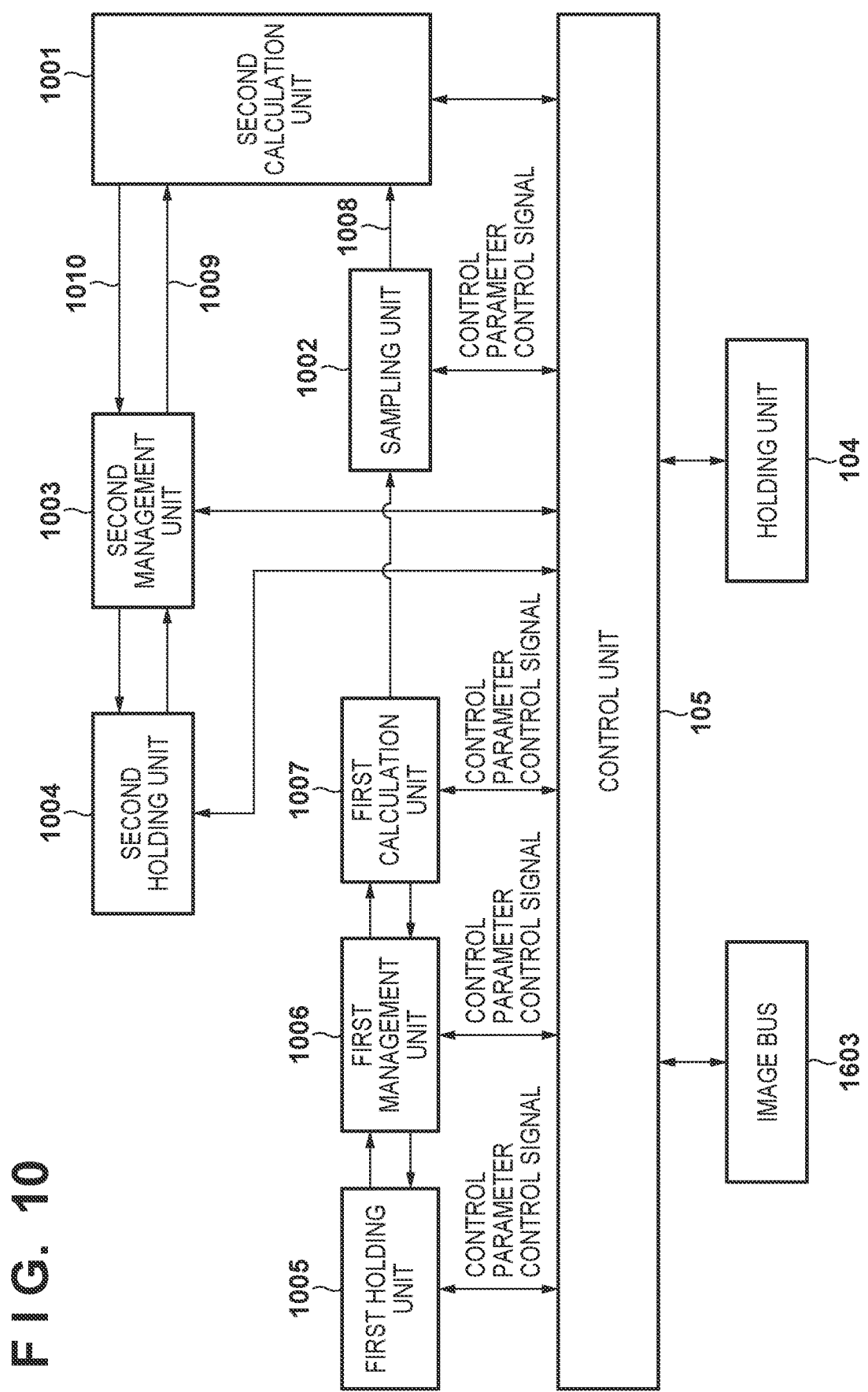
FIG. 10 is a block diagram illustrating a configuration example of the recognition processing unit 1601.

A configuration example of a recognition processing unit 1601 according to the present embodiment will be described with reference to a block diagram of FIG. 10. In FIG. 10, the same functional units as the functional units illustrated in FIG. 1 are denoted by the same reference numerals, and a description of the functional units is omitted.

Each of the first calculation unit 1007 and the second calculation unit 1001 has a plurality of calculating devices. The sampling unit 1002 performs sampling processing. A first management unit 1006 manages memory access to a first holding unit 1005. A second management unit 1003 manages memory access to a second holding unit 1004.

FIG. 17B illustrates an example of a hierarchical layer of a side-output type CNN. In FIG. 17B, the configuration from the input image (input hierarchical layer) 1701 to the hierarchical layer 1706 is the same as that of the first embodiment (FIG. 17A).

In a side-output type neural network, processing is performed by a feature image of a side-output hierarchical layer being further generated from the feature images of these hierarchical layers. In FIG. 17B, input data 1707 to 1710 for the side output hierarchical layer are generated by performing sampling processing on the feature images in each of the hierarchical layers 1703 to 1706. Similar to the processing of the normal hierarchical layers (hierarchical layers 1702 to 1706), the sum-of-products operation processing is repeated for the feature images 1711 to 1713 of the side output hierarchical layer. In the present embodiment, the memory configuration illustrated in FIGS. 4A to 4C is also applied to the second holding unit 1004 that holds a feature image of the side-output hierarchical layer. The first holding unit 1005, the first management unit 1006, and the first calculation unit 1007 correspond to the holding unit 102, the management unit 103, and the calculation unit 101 in the first embodiment, respectively. That is, regarding the functions and operations of the first holding unit 1005, the first management unit 1006, and the first calculation unit 1007, the processing described in the first embodiment on the hierarchical layers 1702 to 1706 is performed as described in the first embodiment. Also, the configuration of the second holding unit 1004 is the same as the configuration of the first holding unit 1005.

Figure 11:
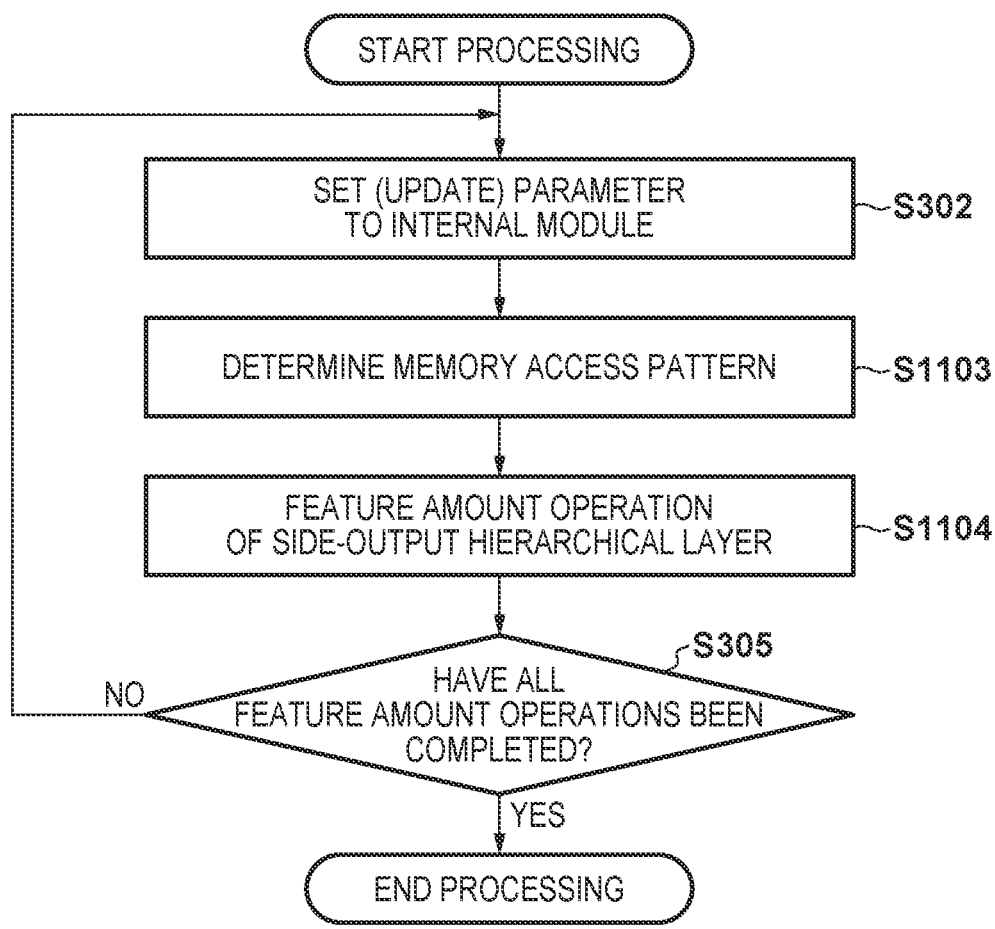
FIG. 11 is a flowchart illustrating details of the process in step S206.

Operation of the recognition processing unit 1601 according to the present embodiment (details of the processing in the above-described step S206) will be described in accordance with the flowchart of FIG. 11. In FIG. 11, the same processing steps as those in FIG. 3 are denoted by the same step numbers, and a description of these processing steps is omitted.

In step S1103, when instructed to start the process, the second management unit 1003 determines a memory access pattern for access to the second holding unit 1004 corresponding to a combination of "a presence/absence of sampling in the sampling unit 1002 and a sampling rate" indicated by the control parameter. In the method of determining the memory access pattern based on the control parameter, for example, the memory access pattern corresponding to the combination of "the presence or absence of sampling in the sampling unit 1002 and the sampling rate" indicated by the control parameter is specified.

In step S1104, when the feature amount operation is started, the second management unit 1003 performs memory access to the feature data (e.g., feature image 1711) of the side-output hierarchical layer of the second holding unit 1004 in accordance with the memory access pattern selected in step S1103. In parallel to this, the first holding unit 1005, the first management unit 1006, and the first calculation unit 1007 start processing for a normal hierarchical layer in the same manner as in the first embodiment. As a behavior different from that of the first embodiment, the first calculation unit 1007 also outputs feature data to the sampling unit 1002.

The sampling unit 1002 performs sampling processing on the feature data (e.g., the hierarchical layer 1708) according to the parameters set in the control unit 105, and outputs the sampled feature data to the second calculation unit 1001. The second calculation unit 1001 performs a sum-of-products operation using the feature data of the side-output hierarchical layer read out by the second management unit 1003 and the feature data of the normal hierarchical layer read out through the first calculation unit 1007 and sampled by the sampling unit 1002. Since the sum-of-products operation processing for normal hierarchical layers (hierarchical layers 1702 to 1706) is the same as that of the first embodiment, a description thereof will be omitted.

FIG. 12 is an example of a timing chart of processing in the case when no sampling processing is performed. At time t1, a pixel block of 16 pixels×2 pixels is input from the first calculation unit 1007 to the sampling unit 1002.

At time t2, the pixel block of the input 16 pixels×2 pixels is output from the sampling unit 1002 as is (without being sampled), and the next 16 pixels×2 pixels are input to the sampling unit 1002. The pixel block sequence 1201 of the feature image of the side output hierarchical layer read by the second management unit 1003 at time t2 is also output to the second calculation unit 1001. When sampling processing is not performed, the second management unit 1003 determines pixel blocks blk(x, y), blk(x+1, y), blk(x, y+1), and blk(x+1, y+1) equivalent to the output block size of the sampling unit 1002 as access patterns.

At time t3, the second calculation unit 1001 performs a sum-of-products operation using the two input feature data items. The sampling unit 1002 and the second management unit 1003 output the next processing target feature data to the second calculation unit 1001.

At time t4, the second calculation unit 1001 outputs an arithmetic result of the pixel block sequence 1201 to the second management unit 1003, and executes sum-of-products process on the pixel block sequence 1202.

FIG. 13 is an example of a timing chart of processing in the case when no sampling processing is performed. The sampling unit 1002 acquires four pixel blocks (16 pixels×2 pixels) from time t1 to time t4, downsamples to pixel block of 32 pixels×1 pixel, and outputs the downsampled pixel block to the second calculation unit 1001 at time t5. The pixel block group 1301 of the feature image of the side-output hierarchical layer read by the second management unit 1003 at time t5 is also output to the second calculation unit 1001. When sampling processing is not performed, the second management unit 1003 determines pixel blocks blk(x, y), blk(x+1, y), blk(x+2, y), and blk(x+3, y) equivalent to the output block size of the sampling unit 1002 as the access pattern. At time t6, the calculation result of the second calculation unit 1001 is output to the second management unit 1003.

As described above, according to the present embodiment, the memory configuration according to the first embodiment can also be applied to the feature image of the side-output hierarchical layer. The feature data (block group) required by the second calculation unit 1001 can be supplied all at once in relation to a plurality of access patterns that are variable for each hierarchical layer in accordance with the presence or absence of sampling, sampling rate, and the like, and the utilization efficiency of the second calculation unit 1001 can be improved. In the second embodiment, downsampling has been described as an example, but the upsampling can be applied in the same manner.

Third Embodiment

The plurality of processing units illustrated in the first embodiment and the second embodiment may be integrated into one unit, or one processing unit may be divided into a plurality of units. Further, one pixel block may be allocated to a plurality of memories.

In the first embodiment and the second embodiment, each pixel block of 8 pixels×1 pixel is held in one memory. However, for example, this pixel block may be divided into two pixel blocks (4 pixels×1 pixel), for example, M0 may be divided into M0_A and M0_B, and the two pixel blocks (4 pixels×1 pixel) may be stored in M0_A and M0_B respectively.

In the first embodiment and the second embodiment, an example in which N=2 has been described, but the present invention is also applicable to a case in which N=3 or more. Examples of memory allocation for N=3 and 4 are illustrated in FIGS. 14A and 14B, respectively. The $N^2 \times 1$ pixel blocks 1401 and 1403 and the N×N or less pixel block groups 1402 and 1404 at arbitrary positions can be read out simultaneously.

Further, as described in the first embodiment, the present invention is also applicable to a configuration in which the memory to be allocated is shifted by N in the vertical direction. FIG. 15 illustrates a configuration in which N=4 and shifting by N in the vertical direction is performed every time x increases. A $1 \times N^2$ or less pixel block 1501 and an N×N or less pixel block 1502 at arbitrary positions can be read out simultaneously. The management unit 103 and the second management unit 1003 determine an access pattern of an arbitrary region within a range of pixel blocks that can be accessed simultaneously.

In the recognition processing using the neural network, parameters determined in advance by learning are applied to each hierarchical layer. The value of N and the pixel block size may be determined according to the number of rows and the number of columns of a feature image that need to be accessed simultaneously, which are obtained from a parameter of the processing target network. In such a case, rather than fixed information, information that changes as appropriate according to a network configuration, the type of process, and the like is stored in a readable/writable RAM 1609, a nonvolatile memory, or the like rather than in the ROM 1608.

Also, by giving the value of N and the pixel block size as constraints on the kernel size, the pooling window size, and the sampling rate at the time of learning, it is possible to speed up access to the memory holding the feature image.

In addition to sampling and pooling, the present invention can also be applied to cases including processing in which the number of rows that are the processing target is variable for each hierarchical layer, such as deconvolution processing or unpooling for increasing the resolution (image size) of a feature image. Such information may be included in the control parameter.

In the above embodiments, recognition processing using a neural network has been described. However, the present invention is not limited to this, and any image processing may be performed.

Also, each functional unit constituting the recognition processing unit 1601 may be implemented by hardware. However, some functional units, for example, the calculation unit 101, the management unit 103, the control unit 105, the first calculation unit 1007, the first management unit 1006, the second calculation unit 1001, the second management unit 1003, the sampling unit 1002, and the like, may be implemented by software (computer program). In this instance, a computer program stored in a memory such as the ROM 1608 is loaded into the RAM 1609 and becomes the target of processing by the control unit 105 and the CPU 1607.

In the first and second embodiments, an example has been described in which the recognition processing unit 1601 is incorporated into an image processing system, but it may be incorporated into other devices for the purpose of performing object detection or recognition, or the like, for an input image and outputting the result. The recognition processing unit 1601 may be a single device. In addition, some or all of the above-described embodiments may be used in combination as appropriate. In addition, some or all of the above-described embodiments may be used selectively.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus having a plurality of calculation units for performing operations for each hierarchical layer of a hierarchical neural network, the apparatus comprising:

a predetermined number of image memories;

one or more processors; and one or more instruction memories coupled to the one or more processors, the one or more instruction memories having stored thereon instructions which, when executed by the one or more processors, cause the apparatus:

to divide, into two-dimensional blocks, a feature image of a hierarchical layer that is made to be a processing target by a calculator and to store each of the two-dimensional blocks in any one of the predetermined number of image memories;

to determine a memory access pattern, which is a pattern for reading the two-dimensional blocks from the predetermined number of image memories, based on a type of an operation to be performed on the feature image; and to read out the two-dimensional blocks from the predetermined number of image memories in accordance with the memory access pattern, wherein, in storing the two-dimensional blocks, the predetermined number of image memories are assigned to respective two-dimensional blocks repeatedly in a predetermined order from a head row/column along a row/column, in a second or a subsequent row/column, a memory that the assignment is started is shifted by a constant number from a previous row/column in the predetermined order, and, in reading out the two-dimensional blocks, a set of two-dimensional blocks corresponding to each of a plurality of memory access patterns is read out from respective memories in a single access cycle.

2. The image processing apparatus according to claim 1, wherein, in a case when a pixel sequence of interest arranged in a first direction in the feature image is divided into units of groups of a predetermined number of two-dimensional blocks, in a case when, for each group, the predetermined number of two-dimensional blocks belonging to the group are stored in the predetermined number of memories, stores a two-dimensional block that is immediately below a two-dimensional block stored in a memory of a first position of the predetermined number in the block sequence of interest in a memory of a second position defined by the first position and the predetermined number.

3. The image processing apparatus according to claim 1, wherein the predetermined number is represented by $N^2$ where N is an integer.

4. The image processing apparatus according to claim 3, wherein the predetermined number of memories consists of memory 0 to memory $N^2-1$, and, in a case when a block sequence of interest arranged in a first direction in the feature image is divided into units of groups of $N^2$ two-dimensional blocks, in a case when, for each group, the two-dimensional blocks 0 to $N^2-1$ belonging to the group are stored in memories 0 to $N^2-1$, respectively, a block that is immediately below a two-dimensional block stored in a memory p (p=0 to $N^2-1$) in the two-dimensional block sequence of interest in a memory q (q=mod(p+N, $N^2$)).

5. The image processing apparatus according to claim 3, wherein the set of two-dimensional blocks are read out from the memories 0 to $N^2-1$ in a single access cycle in accordance with the memory access patterns.

6. The image processing apparatus according to claim 3, wherein the constant number is N.

7. The image processing apparatus according to claim 1, wherein each of the memory access patterns is determined based on information defining a type of the operation for each hierarchical layer of the hierarchical neural network.

8. The image processing apparatus according to claim 7, wherein the information defining the type of the operation for each hierarchical layer of the hierarchical neural network includes at least one of a presence or an absence of pooling, a pooling window size, and a kernel size.

9. The image processing apparatus according to claim 7, wherein the information defining the type of the operation for each hierarchical layer of the hierarchical neural network includes a combination of a presence or an absence of sampling and a sampling rate.

10. The image processing apparatus according to claim 7, wherein the hierarchical layer includes a side output hierarchical layer in the hierarchical neural network.

11. The image processing apparatus according to claim 3, wherein a value of N is determined based on any one of a maximum kernel size, a maximum pooling window size, a sampling rate, and a stride interval used in all hierarchical layers of the hierarchical neural network.

12. The image processing apparatus according to claim 3, wherein a value of N is determined in accordance with a throughput or a resource of the calculator.

13. An image processing method to be performed by an image processing apparatus for performing operations for each hierarchical layer of a hierarchical neural network, the method comprising:
dividing, into two-dimensional blocks, a feature image of a hierarchical layer that is made to be a processing target by a calculator and storing each of the two-dimensional blocks in any one of a predetermined number of memories;
determining a memory access pattern, which is a pattern for reading two-dimensional blocks from the predetermined number of image memories, based on a type of an operation to be performed on the feature image; and
reading out the two-dimensional blocks from the predetermined number of image memories in accordance with the memory access pattern,
wherein, in the storing the two-dimensional blocks, the predetermined number of image memories are assigned to respective two-dimensional blocks repeatedly in a predetermined order from a head row/column along a row/column,
in a second or a subsequent row/column, a memory, which the assignment is started, is shifted by a constant number from a previous row/column in the predetermined order, and
in reading out the two-dimensional blocks, a set of blocks corresponding to each of a plurality of memory access patterns is read out from respective memories in a single access cycle.

14. A non-transitory computer-readable storage medium storing a computer program for causing a computer of an image processing apparatus for performing operations for each hierarchical layer of a hierarchical neural network to perform a method, the method comprising:
dividing, into two-dimensional blocks, a feature image of a hierarchical layer that is made to be a processing target by a calculator and storing each of the two-dimensional blocks in any one of a predetermined number of memories;
determining a memory access pattern, which is a pattern for reading two-dimensional blocks from the predetermined number of image memories, based on a type of an operation to be performed on the feature image; and
reading out the two-dimensional blocks from the predetermined number of image memories in accordance with the memory access pattern,
wherein, in storing the two-dimensional blocks, the predetermined number of image memories are assigned to respective two-dimensional blocks repeatedly in a predetermined order from a head row/column along a row/column,
in a second or a subsequent row/column, a memory that the assignment is started is shifted by a constant number from a previous row/column in the predetermined order, and
in reading out the two-dimensional blocks, a set of blocks corresponding to each of a plurality of memory access patterns is read out from respective memories in a single access cycle.

* * * * *